US009994702B2

(12) United States Patent
Osaka et al.

(10) Patent No.: US 9,994,702 B2
(45) Date of Patent: Jun. 12, 2018

(54) LIQUID MATERIAL FOR FORMING THREE-DIMENSIONAL OBJECT AND MATERIAL SET FOR FORMING THREE-DIMENSIONAL OBJECT, AND THREE-DIMENSIONAL OBJECT PRODUCING METHOD AND THREE-DIMENSIONAL OBJECT PRODUCING APPARATUS

(71) Applicants: Keiko Osaka, Kanagawa (JP); Mariko Kojima, Tokyo (JP); Yoshihiro Norikane, Kanagawa (JP); Hiroshi Iwata, Kanagawa (JP)

(72) Inventors: Keiko Osaka, Kanagawa (JP); Mariko Kojima, Tokyo (JP); Yoshihiro Norikane, Kanagawa (JP); Hiroshi Iwata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 20 days.

(21) Appl. No.: 14/968,184

(22) Filed: Dec. 14, 2015

(65) Prior Publication Data

US 2016/0200908 A1 Jul. 14, 2016

(30) Foreign Application Priority Data

Jan. 9, 2015 (JP) .................................. 2015-003418

(51) Int. Cl.
| | |
|---|---|
| B22F 1/02 | (2006.01) |
| C08L 39/06 | (2006.01) |
| B22F 3/00 | (2006.01) |
| C08L 71/02 | (2006.01) |
| C09D 133/02 | (2006.01) |
| C09D 139/06 | (2006.01) |
| C09D 171/02 | (2006.01) |
| C08J 3/12 | (2006.01) |
| C08L 33/08 | (2006.01) |
| B29C 64/165 | (2017.01) |
| B33Y 10/00 | (2015.01) |
| B33Y 30/00 | (2015.01) |
| B33Y 70/00 | (2015.01) |
| B29K 105/00 | (2006.01) |
| C08K 3/08 | (2006.01) |
| B29C 64/20 | (2017.01) |

(52) U.S. Cl.
CPC ................ *C08L 39/06* (2013.01); *B22F 1/02* (2013.01); *B22F 3/008* (2013.01); *B29C 64/165* (2017.08); *C08J 3/12* (2013.01); *C08L 33/08* (2013.01); *C08L 71/02* (2013.01); *C09D 133/02* (2013.01); *C09D 139/06* (2013.01); *C09D 171/02* (2013.01); *B22F 2999/00* (2013.01); *B29C 64/20* (2017.08); *B29K 2105/0064* (2013.01); *B33Y 10/00* (2014.12); *B33Y 30/00* (2014.12); *B33Y 70/00* (2014.12); *C08K 2003/0856* (2013.01); *C08L 2201/54* (2013.01); *C08L 2312/00* (2013.01)

(58) Field of Classification Search
CPC ................................... B22F 1/02; B22F 3/008
USPC ........................................................ 419/35
See application file for complete search history.

(56) References Cited

U.S. PATENT DOCUMENTS

| | | | |
|---|---|---|---|
| 2006/0165546 A1 | 7/2006 | Yamada et al. | |
| 2016/0271695 A1* | 9/2016 | Osaka ................... | B22F 3/1055 |
| 2016/0272844 A1* | 9/2016 | Osaka ................... | B22F 1/0062 |

FOREIGN PATENT DOCUMENTS

| | | |
|---|---|---|
| JP | 2000-328106 | 11/2000 |
| JP | 2003-048253 | 2/2003 |
| JP | 2004-330743 | 11/2004 |
| JP | 2005-297325 | 10/2005 |
| JP | 2006-200030 | 8/2006 |
| JP | 2009-275097 | 11/2009 |
| WO | WO2015/046629 A1 | 4/2015 |

OTHER PUBLICATIONS

U.S. Appl. No. 14/816,370, filed Aug. 3, 2015.

* cited by examiner

*Primary Examiner* — Edward J Cain
(74) *Attorney, Agent, or Firm* — Oblon, McClelland, Maier & Neustadt, L.L.P.

(57) ABSTRACT

Provided is a liquid material for forming a three-dimensional object, the liquid material adapted to be delivered to a powder material for forming a three-dimensional object to harden the powder material, the powder material containing an organic material and a base material, the liquid material including a cross-linking agent cross-linkable with the organic material and a resin having a glass transition temperature of 50° C. or higher or a melting point of 50° C. or higher.

9 Claims, 3 Drawing Sheets

LIQUID MATERIAL FOR FORMING THREE-DIMENSIONAL OBJECT AND MATERIAL SET FOR FORMING THREE-DIMENSIONAL OBJECT, AND THREE-DIMENSIONAL OBJECT PRODUCING METHOD AND THREE-DIMENSIONAL OBJECT PRODUCING APPARATUS

BACKGROUND OF THE INVENTION

Field of the Invention

The present invention relates to a liquid material for forming a three-dimensional object and a material set for forming a three-dimensional object, and a three-dimensional object producing method and a three-dimensional object producing apparatus.

Description of the Related Art

In recent years, there have been increasing needs for small-lot production of complicated, fine three-dimensional objects. As the techniques for meeting these needs, a powder sintering method, a powder adhering method, etc. have been proposed (see, e.g., Japanese Patent Application Laid-Open Nos. 2000-328106, 2006-200030, and 2003-48253).

The powder sintering method is a method for forming a powder thin layer, irradiating the thin layer with laser light to form a thin sintered body, and repeating these steps to stack layers of thin sintered bodies over the thin sintered body sequentially to obtain a desired three-dimensional object. The powder adhering method is a method for hardening a powder thin layer with an adhesive material instead of by laser sintering in the powder sintering method, and stacking such hardened powder thin layers to obtain a desired three-dimensional object.

Proposed examples of the powder adhering method include a method for supplying an adhesive material to a powder thin layer by ink-jetting, a method for placing a powder material, which is a mixture of powder particles and adhesive particles, and delivering a binding agent to the powder material to dissolve and solidify the adhesive particles and produce a three-dimensional object (see JP-A No. 2004-330743), and a method for dissolving a powder material containing a base such as glass and ceramic and a hydrophobic resin coating the base with a resin coated with a hydrophobic solvent such as limonene and solidifying the powder material and the resin to produce a three-dimensional object (see JP-A No. 2005-297325).

However, inkjet supplying of the adhesive material may be accompanied by problems such as clogging of the nozzle heads used, limitations in the selection of adhesive materials that can be used, inefficiency due to large costs involved, etc.

The technique described in JP-A No. 2005-297325 has a risk that the limonene having a low volatility tends to remain in the three-dimensional object and reduces the strength of the three-dimensional object. Furthermore, lowly volatile solvents such as toluene are problematic in safety. Moreover, the powder material needs to be coated with the coating resin having a large coating film thickness (i.e., needs to be coated with a large amount of the coating resin) in order for the powder particles to be bound together at only the coating resin. This makes it impossible for the three-dimensional object to have a sufficient precision, or brings about a problem that the density of the base material in the three-dimensional object is low. Particularly, when the final goal of the three-dimensional object produced is a metal sintered body or a ceramic sintered body that needs a post-treatment such as dewaxing of the resin and sintering, the incapability of providing the base material at a sufficiently high density makes problems relating to the strength and precision of the sintered body outstanding.

SUMMARY OF THE INVENTION

An object of the present invention is to save a production time in a three-dimensional object producing method capable of producing a three-dimensional object having a complicated stereoscopic (three-dimensional (3D)) shape with a powder material of a metal or the like easily, efficiently, without letting the three-dimensional object undergo a shape collapse before sintering, etc., and with a good dimensional precision.

A liquid material for forming a three-dimensional object of the present invention as a solution to the problems described above is a liquid material adapted to be delivered to a powder material for forming a three-dimensional object containing an organic material and a base material to harden the powder material for forming a three-dimensional object. The liquid material contains a cross-linking agent cross-linkable with the organic material and a resin having a glass transition temperature of 50° C. or higher or a melting point of 50° C. or higher.

According to the present invention, it is possible to provide a liquid material for forming a three-dimensional object, capable of producing a three-dimensional object having a complicated stereoscopic (three-dimensional (3D)) shape with a powder material of a metal or the like easily, efficiently, without letting the three-dimensional object undergo a shape collapse before sintering, etc., and with a good dimensional precision, and also capable of saving a time taken for producing the three-dimensional object.

DETAILED DESCRIPTION OF THE INVENTION

Figure 1:
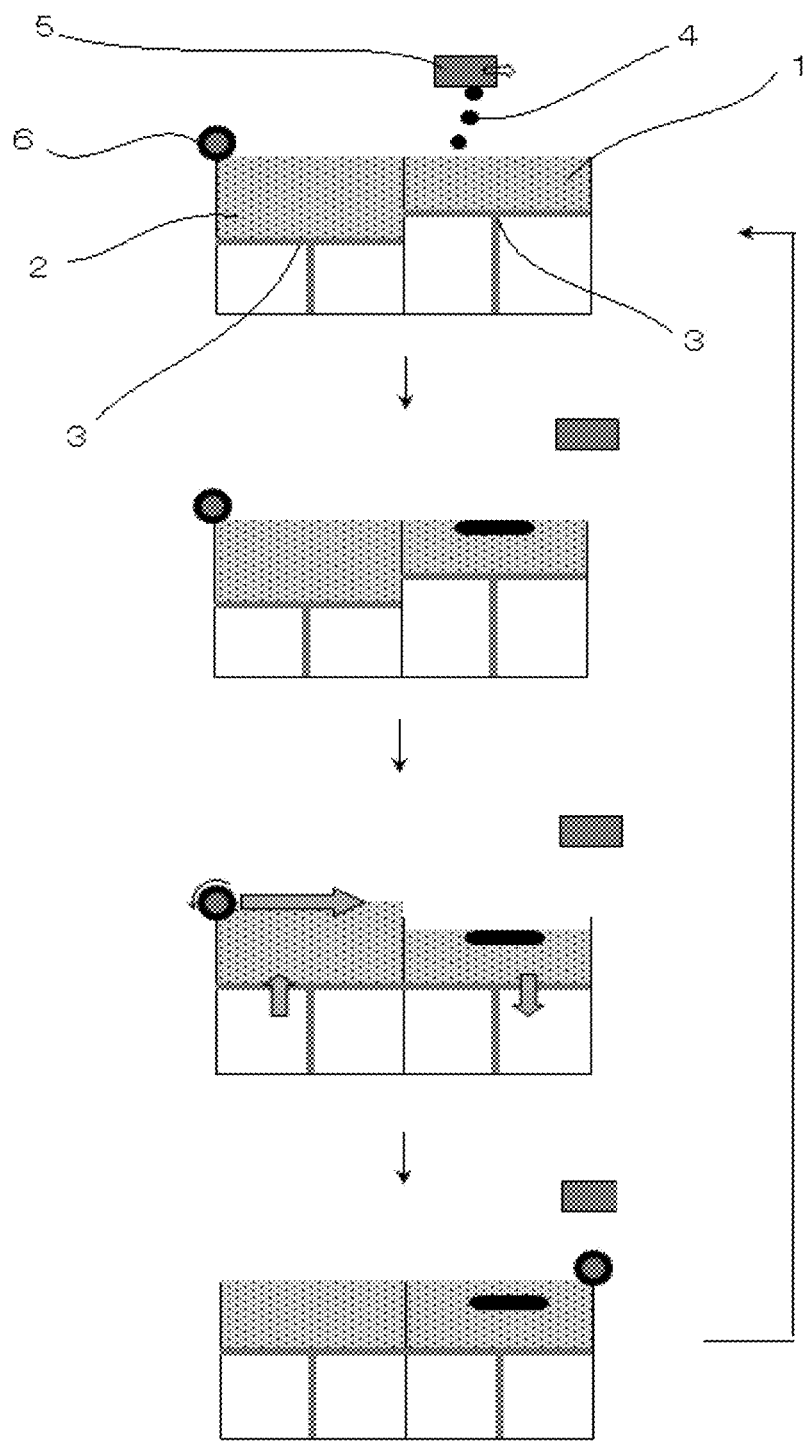
FIG. 1 is a schematic diagram illustrating an example of a three-dimensional object producing apparatus of the present invention.

When delivered to the organic material, a liquid material for forming a three-dimensional object of the present invention dissolves the organic material and cross-links the organic material by the action of a cross-linking agent contained in the liquid material.

The "cross-linking agent" in the present invention refers to a compound that has a site capable of having a cross-linking reaction with a functional group of a target of cross-linking (an organic material such as a polymer), and by having a cross-linking reaction, itself becomes a constituent element of a bonded site of a cross-linked bond between target points of cross-linking. Hence, the cross-linking agent is conceptually different from a so-called "initiator" such as a peroxide (organic peroxide) and a reducing substance that itself does not become a constituent element of a cross-linked bonded site, but initiates or promotes a radical reaction by itself pyrolyzing or photolyzing to produce free radicals, having the free radicals added to an unsaturated monomer to open double bonds and simultaneously produce a new radical reaction, and repeating this process to promote polymerization, or by abstracting hydrogen atoms bound to carbon atoms of a saturated compound to produce new radicals, and having the produced radicals recombine to form a bridge in the saturated compound. Therefore, the "initiator" is clearly distinguished from the "cross-linking agent" of the present invention.

The liquid material for forming a three-dimensional object of the present invention further contains a resin having a glass transition temperature of 50° C. or higher or a melting point of 50° C. or higher. This promotes solidification of the organic material by the cross-linking agent and by drying and enables a firm three-dimensional object to be obtained in a short time.

A material set for forming a three-dimensional object of the present invention includes: a powder material for forming a three-dimensional object containing an organic material and a base material; and the liquid material for forming a three-dimensional object of the present invention.

In the material set for forming a three-dimensional object of the present invention, the organic material contained in the powder material for forming a three-dimensional object can be dissolved and cross-linked by the action of the liquid material for forming a three-dimensional object. Therefore, when the liquid material is delivered to the organic material, the organic material is dissolved and cross-linked by the action of the cross-linking agent contained in the liquid material. Therefore, when the powder material for forming a three-dimensional object included in the material set for forming a three-dimensional object of the present invention is supplied and the liquid material for forming a three-dimensional object included in the material set for forming a three-dimensional object of the present invention is caused to act on the supplied powder material, the supplied powder material is hardened.

A three-dimensional object producing method of the present invention repeats a powder material layer forming step of forming a layer of a powder material for forming a three-dimensional object containing an organic material and a base material, and a liquid material delivering step of delivering a liquid material for forming a three-dimensional object to a predetermined region of the layer of the powder material formed in the powder material layer forming step, to produce a three-dimensional object According to the three-dimensional object producing method of the present invention, in the powder material layer forming step, a powder material for forming a three-dimensional object containing an organic material and a base material is supplied. In one example, the supplied powder material for forming a three-dimensional object is placed in a manner to have a predetermined thickness. Then, in the liquid material delivering step, a liquid material containing a cross-linking agent cross-linkable with the organic material is delivered to the powder material supplied in the powder material layer forming step, to harden a predetermined region of the supplied powder material. The powder material for forming a three-dimensional object contains the base material coated with the organic material. When the liquid material is delivered to the organic material, the organic material is dissolved and cross-linked by the action of the cross-linking agent contained in the liquid material to form a three-dimensional network. Hence, the powder material supplied in the powder material layer forming step is hardened to have a good dimensional precision and a favorable strength.

Through repetition of the powder material layer forming step and the liquid material delivering step, a complicated three-dimensional object is produced easily, efficiently, without undergoing a shape collapse before sintering, etc., and with a good dimensional precision. The obtained three-dimensional object has a favorable hardness. Hence, the three-dimensional object does not undergo a shape collapse when held in a hand or blown with air for, for example, removal of any excess powder material for forming a three-dimensional object, and can be subjected to sintering, etc. later with ease. In the three-dimensional object, the base material is present densely (at a high filling rate), and the organic material is present only slightly around the particles of the base material. Therefore, when the three-dimensional object is subjected to sintering or the like later to obtain a compact (a sintered body), the obtained compact contains few unnecessary voids, etc., and a compact (a sintered body) having a beautiful appearance can be obtained.

A three-dimensional object producing apparatus of the present invention includes a powder material layer forming unit configured to form a layer of a powder material for forming a three-dimensional object containing an organic material and a base material, a liquid material delivering unit configured to deliver the liquid material for forming a three-dimensional object of the present invention to a predetermined region of the layer of the powder material formed by the powder material layer forming unit, a powder material container in which the powder material for forming a three-dimensional object is contained, and a liquid material container in which the liquid material for forming a three-dimensional object is contained.

(Material Set for Forming Three-Dimensional Object)

The material set for forming a three-dimensional object of the present invention includes: a powder material containing an organic material and a base material; and a liquid material containing a cross-linking agent and a resin having a glass transition temperature of 50° C. or higher or a melting point of 50° C. or higher, and further includes other components, etc. as needed.

The material set for forming a three-dimensional object of the present invention can be used favorably for production of various compacts and structures, and can be used particularly favorably for the three-dimensional object producing method of the present invention and the three-dimensional object producing apparatus of the present invention, which are described below, and for a three-dimensional object obtained according to the present invention.

When the material set for forming a three-dimensional object of the present invention is used for producing a structure, it is possible to produce a structure having a complicated three-dimensional shape easily, efficiently, and with a good dimensional precision only by causing the liquid material for forming a three-dimensional object to act on the powder material for forming a three-dimensional object and by performing drying as needed. The structure obtained in this way is a hardened product (a three-dimensional object) that has a sufficient hardness, and excellent treatability and excellent handleability without undergoing a shape collapse even when held in a hand, brought into or out from a mold, or blown with air to remove any excess powder material for forming a three-dimensional object. The hardened product may be used as it is, or as a hardened product to be sintered, may further be subjected to sintering to be produced as a compact (a sintered body of the three-dimensional object). When the three-dimensional object is sintered, the compact resulting from the sintering will contain no unnecessary voids or the like. Therefore, a compact having a beautiful appearance can be obtained easily.

(Powder Material for Forming Three-Dimensional Object)

The powder material for forming a three-dimensional object included in the material set for forming a three-dimensional object of the present invention contains an organic material and a base material, and further contains other components, etc. as needed. It is preferable that the organic material coat the base material. The organic material may contain an inorganic material as needed.

The powder material for forming a three-dimensional object is used in the three-dimensional object producing method of the present invention described below.

—Base Material—

The base material is not particularly limited, and an arbitrary base material may be selected according to the purpose so long as such a base material has a form of a powder or particles. Examples of the constituent material of the base material include metals, ceramics, carbon, polymers, wood, bioaffinitive materials, and sand. Metals, ceramics, and the like that can be sintered eventually are preferable in terms of obtaining a three-dimensional object having a high strength.

Preferable examples of the metals include stainless (SUS) steel, iron, copper, titanium, and silver. Examples of the stainless (SUS) steel include SUS316L.

Examples of the ceramics include metal oxides. Specific examples include silica ($SiO_2$), alumina ($Al_2O_3$), zirconia ($ZrO_2$), and titania ($TiO_2$).

Examples of the carbon include graphite, graphene, carbon nanotube, carbon nanohorn, and fullerene.

Examples of the polymers include known water-insoluble resins.

Examples of the wood include wood chip and cellulose.

Examples of the bioaffinitive materials include a polylactic acid and calcium phosphate.

One of these materials may be used alone, or two or more these materials may be used in combination.

In the present invention, the base material may be commercially-available particles or powders made of these constituent materials.

Examples of the commercially available products include SUS316L (PSS316L available from Sanyo Special Steel Co., Ltd.), $SiO_2$ (EXCELICA SE-15 available from Tokuyama Corporation), $AlO_2$ (TAIMICRON TM-5D available from Taimei Chemicals Co., Ltd.), and $ZrO_2$ (TZ-B53 available from Tosoh Corporation)

A known surface (reforming) treatment may be applied to the base material in order to enhance affinity with the organic material.

An average particle diameter of the base material has no particular limit, and may be appropriately selected according to the purpose. However, the average particle diameter is preferably from 0.1 μm to 500 μm, more preferably from 5 μm to 300 μm, and yet more preferably from 15 μm to 250 μm.

When the average particle diameter is from 0.1 μm to 500 μm, efficiency of producing a three-dimensional object is excellent, and treatability and handleability are favorable. When the average particle diameter is 500 μm or less, a filling rate of the powder material for forming a three-dimensional object when the powder material for forming a three-dimensional object is supplied to have a predetermined thickness is improved. This makes it less likely for voids, etc. to be produced in a three-dimensional object obtained.

The average particle diameter of the base material can be measured with a known particle diameter measuring instrument, for example, MICROTRAC HRA (available from Nikkiso Co., Ltd.) according to a known method.

A granularity distribution of the base material has no particular limit, and may be appropriately selected according to the purpose.

The base material may be of any contour, any surface area, any circularity, any flowability, and any wettability that are appropriately selected according to the purpose.

—Organic Material—

The organic material may be any organic material that has a property of dissolving in the liquid material for forming a three-dimensional object and being cross-linkable by the action of the cross-linking agent contained in the liquid material.

In the present invention, the solubility of the organic material refers to a level that when 1 g of the organic material is mixed and stirred in the liquid material having a temperature of 30° C. per 100 g of a solvent contained in the liquid material, equal to or greater than 90% by mass of the organic material dissolves.

A viscosity of the organic material in a 4% by mass (w/w %) solution of the organic material at 20° C. is preferably 40 mPa·s or lower, more preferably from 1 mPa·s to 35 mPa·s, and particularly preferably from 5 mPa·s to 30 mPa·s.

When the viscosity is 40 mPa·s or lower, a hardened product (three-dimensional object) formed of the powder material for forming a three-dimensional object and produced by delivering the liquid material to the powder material for forming a three-dimensional object has an improved strength and is less likely to have problems such as a shape collapse during post-treatment or handling such as sintering. Further, the hardened product (three-dimensional object) formed of the powder material for forming a three-dimensional object and produced by delivering the liquid material to the powder material for forming a three-dimensional object tends to have an improved dimensional precision.

The viscosity can be measured according to, for example, JIS K7117.

The organic material is not particularly limited, and an arbitrary organic material may be selected according to the purpose. However, a water-soluble organic material is preferable in terms of handleability, environmental hazardousness, etc. Examples of such organic materials include water-soluble resins and water-soluble prepolymers. Use of such a water-soluble organic material in the powder material for forming a three-dimensional object allows use of an aqueous medium as a medium of the liquid material. Furthermore, such a water-soluble organic material can be easily separated from the base material by water treatment in disposal or recycling of the powder material.

Examples of the water-soluble resins include a polyvinyl alcohol resin, a polyacrylic acid resin, a cellulose resin, starch, gelatin, a vinyl resin, an amide resin, an imide resin, an acrylic resin, and polyethylene glycol.

These water-soluble resins may be a homopolymer or a heteropolymer (copolymer), may be modified, may have a known functional group incorporated, or may be in the form of a salt, so long as these water-soluble resins have water solubility.

Hence, the polyvinyl alcohol resin may be a polyvinyl alcohol, a polyvinyl alcohol modified with an acetoacetyl group, an acetyl group, silicone, etc. (e.g., an acetoacetyl group-modified polyvinyl alcohol, an acetyl group-modified polyvinyl alcohol, and a silicone-modified polyvinyl alcohol), or a butanediol vinyl alcohol copolymer, etc. The polyacrylic acid resin may be a polyacrylic acid or a salt such as sodium polyacrylate. The cellulose resin may be a cellulose or a carboxy methyl cellulose (CMC), etc. The acrylic resin may be a polyacrylic acid or an acrylic acid-maleic anhydride copolymer, etc.

Examples of the water-soluble prepolymers include an adhesive water-soluble isocyanate prepolymer contained in a water sealant, etc.

Examples of organic materials and resins that are not water-soluble include acrylic, a maleic acid, silicones, butyral, polyesters, polyvinyl acetate, a vinyl chloride/vinyl acetate copolymer, polyethylenes, polypropylene, polyacetal, an ethylene/vinyl acetate copolymer, an ethylene/(meth)acrylic acid copolymer, an α-olefin/maleic anhydride-based copolymer, an esterified product of an α-olefin/maleic anhydride-based copolymer, polystyrenes, poly(meth)acrylic acid esters, an α-olefin/maleic anhydride/vinyl group-containing monomer copolymer, a styrene/maleic anhydride copolymer, a styrene/(meth)acrylic acid ester copolymer, polyamide, an epoxy resin, a xylene resin, ketone resins, petroleum resins, rosin or derivatives of rosin, a coumarone-indene resin, a terpene resin, a polyurethane resin, synthetic rubbers such as styrene/butadiene rubbers, polyvinyl butyral, nitrile rubbers, acrylic rubbers, and ethylene/propylene rubbers, and nitrocelluloses.

In the present invention, organic materials having a cross-linkable functional group are preferable among the organic materials described above. The cross-linkable functional group is not particularly limited, and an arbitrary cross-linkable functional group may be selected according to the purpose. Examples of the cross-linkable functional group include a hydroxyl group, a carboxyl group, an amide group, a phosphoric acid group, a thiol group, an acetoacetyl group, and an ether bond.

It is preferable that the organic material have the cross-linkable functional group, because this makes it easier for the organic material to be cross-linked and form a hardened product (three-dimensional object). Among organic materials having the cross-linkable functional group, a polyvinyl resin having an average degree of polymerization of from 400 to 1,100 is preferable. Furthermore, a modified polyvinyl alcohol resin that has a cross-linkable functional group incorporated into a molecule as described above is preferable. An acetoacetyl group-modified polyvinyl alcohol resin is particularly preferable.

When the polyvinyl alcohol resin has the acetoacetyl group, a metal in the cross-linking agent contained in the liquid material acts to allow the acetoacetyl group to easily form a complicated three-dimensional network structure (cross-linked structure) via the metal. That is, the acetoacetyl group-modified polyvinyl alcohol resin is excellent in cross-linking reactivity, and highly excellent in bending strength.

One such acetoacetyl group-modified polyvinyl alcohol resin may be used alone, or two or more of such acetoacetyl group-modified polyvinyl alcohol resins different in properties such as viscosity and degree of saponification may be used in combination. It is more preferable to use an acetoacetyl group-modified polyvinyl alcohol resin having an average degree of polymerization of from 400 to 1,100.

One of the organic materials described above may be used alone, or two or more of these may be used in combination. The organic materials may be appropriately synthesized products or commercially available products.

Examples of the commercially available products include polyvinyl alcohols (PVA-205C and PVA-220C available from Kurary Co., Ltd.), a polyacrylic acid (JULIMER AC-10 available from Toagosei Co., Ltd.), sodium polyacrylate (JULIMER AC-103P available from Toagosei Co., Ltd.), acetoacetyl group-modified polyvinyl alcohols (GOHSENX Z-300, GOHSENX Z-100, GOHSENX Z-200, GOHSENX Z-205, GOHSENX Z-210, and GOHSENZ Z220 available from Nippon Synthetic Chemical Industry Co., Ltd.), carboxy group-modified polyvinyl alcohols (GOHSENX T-330, GOHSENX T-350, and GOHSENX T-330T available from Nippon Synthetic Chemical Industry Co., Ltd.), a butanediol vinyl alcohol copolymer (NICHIGO G-POLYMER OKS-8041 available from Nippon Synthetic Chemical Industry Co., Ltd.), sodium carboxy methyl cellulose (CELLOGEN 5A available from Daiichi Kogyo Co., Ltd.), starch (HI-STARD PSS-5 available from Sanwa Starch Co., Ltd.), and gelatin (BEMATRIX GELATIN available from Nitta Gelatin Inc.).

In coating the base material with the organic material, a coating thickness of the organic material over the base material as expressed in average thickness is preferably from 5 nm to 1,000 nm, more preferably from 5 nm to 500 nm, yet more preferably from 50 nm to 300 nm, and particularly preferably from 100 nm to 200 nm.

In the present invention, utilization of the hardening action of the cross-linking agent enables a coating thickness smaller than in the conventional products. This ensures a produced three-dimensional object both of strength and precision.

When the average thickness as the coating thickness is 5 nm or greater, a hardened product (three-dimensional object) formed of the powder material for forming a three-dimensional object and produced by delivering the liquid material to the powder material for forming a three-dimensional object has an improved strength. Owing to the improved strength, problems such as a shape collapse will not occur during post-treatment or handling such as sintering. When the average thickness is 1,000 nm or less, the hardened product (three-dimensional object) formed of the powder material for forming a three-dimensional object and produced by delivering the liquid material to the powder material for forming a three-dimensional object has an improved dimensional precision.

The average thickness can be measured with a microscope after the powder material for forming a three-dimensional object is embedded in an acrylic resin or the like and the surface of the base material is exposed by etching or the like. The microscope may be, for example, a scanning tunneling microscope (STM), an atomic force microscope (AFM), and a scanning electron microscope (SEM).

A coverage (area ratio) by the organic material over the surface of the base material has no particular limit and may be appropriately selected according to the purpose. However, the coverage is preferably 15% or greater, more preferably 50% or greater, and particularly preferably 80% or greater.

When the coverage is 15% or greater, a hardened product (three-dimensional object) formed of the powder material for forming a three-dimensional object and produced by delivering the liquid material to the powder material for forming a three-dimensional object has a sufficient strength. Owing to the sufficient strength, problems such as a shape collapse will not occur during post-treatment or handling such as sintering. Further, owing to the sufficient strength, the hardened product (three-dimensional object) formed of the powder material for forming a three-dimensional object and produced by delivering the liquid material to the powder material has an improved dimensional precision.

The coverage can be measured by observing a photograph of the powder material for forming a three-dimensional object, calculating the ratio (%) of the area coated by the organic material to the whole area of the surface of each particle of the powder material captured in the two-dimensional photograph, and averaging the ratios.

Alternatively, the coverage can be measured by elemental mapping of the portion coated by the organic material based on energy dispersive X-ray spectrometry such as SEM-EDS.
—Other Components—

The other components are not particularly limited, and arbitrary components may be selected according to the purpose. Examples of the other components include fluidizers, fillers, leveling agents, and sintering aids. It is preferable that the powder material for forming a three-dimensional object contain a fluidizer, because this makes it possible to supply the powder material for forming a three-dimensional object to have a certain thickness easily and efficiently. It is preferable that the powder material for forming a three-dimensional object contain a filler, because this makes it less likely for the hardened product (three-dimensional object) produced to include voids, etc. It is preferable that the powder material for forming a three-dimensional object contain a leveling agent, because this improves wettability of the powder material for forming a three-dimensional object and facilitates handling, etc. It is preferable that the powder material for forming a three-dimensional object contain a sintering aid, because this makes it possible for the hardened product (three-dimensional object) produced to be sintered at a lower temperature in a sintering treatment.
—Production of Powder Material for Forming Three-Dimensional Object—

A method for producing the powder material for forming a three-dimensional object is not particularly limited, and an arbitrary method may be selected according to the purpose. Preferable examples of the method include a method for coating the base material with the organic material according to a known coating method.

The method for coating the surface of the base material with the organic material is not particularly limited, and an arbitrary method may be employed from known coating methods. Preferable examples of such known coating methods include tumbling fluidized bed coating, spray drying, a stirring mixing adding method, dipping, and kneader coating. These coating methods can be carried out with known commercially available various coaters and granulators.
—Physical Properties of Powder Material for Forming Three-Dimensional Object—

An average particle diameter of the powder material for forming a three-dimensional object has no particular limit and may be appropriately selected according to the purpose. However, the average particle diameter is preferably from 3 µm to 250 µm, more preferably from 3 µm to 200 µm, yet more preferably from 5 µm to 150 µm, and particularly preferably from 10 µm to 85 µm.

When the average particle diameter is 3 µm or greater, the powder material has an improved flowability. This makes it easier to place the powder material to have a predetermined thickness and improves smoothness of the surface of the powder material for forming a three-dimensional object placed. Owing to the improved smoothness of the surface, there is a tendency that the efficiency of producing a three-dimensional object, and treatability/handleability and dimensional precision of the three-dimensional object are improved. When the average particle diameter is 250 µm or less, the space between the powder material particles is small. This provides a small voidage in the object and contributes to enhancement of the strength. Hence, an average particle diameter range of from 3 µm to 250 µm is preferable for simultaneous satisfaction of dimensional precision and strength.

A granularity distribution of the powder material for forming a three-dimensional object has no particular limit and may be appropriately selected according to the purpose.

A repose angle of the powder material for forming a three-dimensional object as a property of the powder material is preferably 60° or less, more preferably 50° or less, and yet more preferably 40° or less.

When the repose angle is 60° or less, the powder material for forming a three-dimensional object can be stably placed at a desired location over a supporting member efficiently.

The repose angle can be measured with, for example, a powder characteristic measuring instrument (POWDER TESTER PT-N TYPE available from Hosokawa Micron Corporation).

The powder material for forming a three-dimensional object can be used favorably for simple, efficient production of various compacts and structures. The powder material can be used particularly favorably for the liquid material of the present invention, the material set for forming a three-dimensional object of the present invention, a three-dimensional object producing method of the present invention, and a three-dimensional object producing apparatus of the present invention described below.

It is possible to produce a structure having a complicated three-dimensional shape easily, efficiently, and with a good dimensional precision, only by delivering the liquid material for forming a three-dimensional object of the present invention to the powder material for forming a three-dimensional object. The structure produced in this way is a hardened product (three-dimensional object) having a sufficient hardness, and excellent in treatability and handleability without undergoing a shape collapse even when held in a hand, brought into or out from a mold, or blown with air to remove any excess powder material for forming a three-dimensional object. The hardened product may be used as it is, or as a hardened product to be sintered, may further be subjected to a sintering treatment to be produced as a compact (a sintered body of the three-dimensional object). Through the sintering treatment, the compact resulting from the sintering includes no unnecessary voids, etc., and a compact having a beautiful appearance can be obtained easily.

(Liquid Material for Forming Three-Dimensional Object)

The liquid material for forming a three-dimensional object of the present invention is a liquid material used together with the powder material included in the material set for forming a three-dimensional object of the present invention. The liquid material contains a resin and a cross-linking agent. The cross-linking agent is cross-linkable with: a resin having a glass transition temperature of 50° C. or higher or a melting point of 50° C. or higher; and the organic material. The liquid material for forming a three-dimensional object of the present invention further contains a medium (solvent) to dissolve the organic material and a component that may promote the dissolution, and further contains other components as needed.

When the liquid material is delivered to the organic material, the organic material is dissolved and cross-linked by the action of the cross-linking agent contained in the liquid material.

A viscosity of the liquid material for forming a three-dimensional object of the present invention is preferably 25 mPa·s or lower at 25° C., and more preferably from 3 mPa·s to 20 mPa·s at 25° C. When the viscosity is 25 mPa·s or lower at 25° C., the liquid material can be discharged sufficiently stably when the liquid material is delivered according to an inkjet method.

—Medium—

The medium is not particularly limited, and an arbitrary medium may be selected according to the purpose so long as such a medium can dissolve the organic material. Examples of the medium include an aqueous medium such as water, alcohol such as ethanol, ether, and ketone. Further examples of the medium include an aliphatic hydrocarbon, an ether-based solvent such as glycol ether, an ester-based solvent such as ethyl acetate, a ketone-based solvent such as methyl ethyl ketone, and a higher alcohol. Among these, an aqueous medium is preferable and water is more preferable considering environmental hazardousness and discharging stability (i.e., a small temporal viscosity change) of the liquid material in delivery of the liquid material according to an inkjet method. The water as the aqueous medium may contain a component other than water such as the alcohol in a small amount. When the medium of the liquid material is an aqueous medium, it is preferable that the organic material mainly contain a water-soluble organic material.

—Resin—

The resin is not particularly limited, and an arbitrary resin may be selected according to the purpose so long as a glass transition temperature or a melting point of such a resin is from 50° C. to 300° C., and more preferably from 65° C. to 300° C. A resin of which glass transition temperature or melting point is 50° C. or higher imparts a sufficient solidified strength for retaining a shape of a three-dimensional object to a mixture between the organic material dissolved upon delivery of the liquid material and the resin contained in the liquid material when the mixture is solidified. Further, a resin of which glass transition temperature or melting point is 50° C. or higher can more save the time taken for a drying step of drying the three-dimensional object than when the resin is not used. Furthermore, a resin of which glass transition temperature or melting point is 65° C. or higher can impart not only a retainable shape but also a sufficient strength to the three-dimensional object. The glass transition temperature or the melting point can be measured with, for example, a differential scanning calorimeter (DSC).

A resin of which glass transition temperature or melting point is 300° C. or lower has a decomposition point lower than the decomposition point of a resin of which glass transition temperature or melting point is 300° C. or higher. Hence, use of a resin of which glass transition temperature or melting point is 300° C. or lower can more save thermal energy necessary for dewaxing a three-dimensional object.

Examples of the resin of which glass transition temperature or melting point is from 65° C. to 300° C. include an acrylic resin, a polyvinyl pyrrolidone resin, and a polyethylene glycol resin.

A content of the resin added in the liquid material for forming a three-dimensional object is preferably from 0.1% by mass to 10% by mass, and more preferably from 0.5% by mass to 5% by mass. When the content is 0.1% by mass or greater, a hardened product (three-dimensional object) formed of the powder material for forming a three-dimensional object and produced by delivering the liquid material to the powder material for forming a three-dimensional object has an improved strength. Owing to the improved strength, problems such as a shape collapse will not occur during post-treatment or handling such as sintering. When the content is 10% by mass or less, the liquid material can be discharged sufficiently stably when the liquid material is delivered according to an inkjet method.

—Cross-Linking Agent—

The cross-linking agent is not particularly limited, and an arbitrary cross-linking agent may be selected according to the purpose so long as such a cross-linking agent has a property of being able to cross-link the organic material. Examples of the cross-linking agent include metal salts, metal complexes, zirconia-based cross-linking agents, titanium-based cross-linking agents, water-soluble organic cross-linking agents, and chelate agents. One of these may be used alone, or two or more of these may be used in combination. Among these, metal salts are more preferable.

Examples of the zirconia-based cross-linking agents include zirconium oxychloride and ammonium zirconium carbonate.

Examples of the titanium-based cross-linking agents include titanium acylate and titanium alkoxide.

Examples of the water-soluble organic cross-linking agents include a carbodiimide group-containing compound and a bis-vinyl sulfone compound.

Examples of the chelate agents include an organotitanium chelate and an organozirconium chelate.

Preferable examples of the metal salts include metal salts that ionize to a divalent or higher cationic metals in water. Preferable specific examples of the metal salts include zirconium oxychloride octahydrate (tetravalent), aluminium hydroxide (trivalent), magnesium hydroxide (divalent), titanium lactate ammonium salt (tetravalent), basic aluminium acetate (trivalent), zirconium carbonate ammonium salt (tetravalent), titanium triethanol aminate (tetravalent), glyoxylate, and zirconium lactate ammonium salt.

These metal salts may be commercially available products. Examples of the commercially available products include zirconium oxychloride octahydrate (zirconium oxychloride available from Daiichi Kigenso Kagaku Kogyo Co., Ltd.), aluminium hydroxide (available from Wako Pure Chemical Industries, Ltd.), magnesium hydroxide (available from Wako Pure Chemical Industries, Ltd.), titanium lactate ammonium salt (ORGATIX TC-300 available from Matsumoto Fine Chemical Co., Ltd.), zirconium lactate ammonium salt (ORGATIX ZC-300 available from Matsumoto Fine Chemical Co., Ltd.), basic aluminium acetate (available from Wako Pure Chemical Industries, Ltd.), a bis-vinyl sulfone compound (VS-B (K-FJC) available from Fuji Fine Chemical Co., Ltd.), zirconium carbonate ammonium salt (ZIRCOZOL AC-20 available from Daiichi Kigenso Kagaku Kogyo Co., Ltd.), titanium triethanol aminate (OR-GATIX TC-400 available from Matsumoto Fine Chemical Co., Ltd.), glyoxylate (SAFELINK SPM-01 available from Nippon Synthetic Chemical Industry Co., Ltd.), and adipic acid dihydrazide (available from Otsuka Chemical Co., Ltd.). A metal salt having a metal valence of 2 or greater is preferable because such a metal salt can improve cross-linking strength and impart a favorable strength to a three-dimensional object obtained.

Preferable examples of ligands of the cationic metals include lactate ions that can impart excellent discharging stability (temporal stability) to the liquid material.

A cross-linking agent in which ligands of the cationic metal are carbonate ions, e.g., ammonium zirconium carbonate, tends to change properties as the cross-linking agent in an aqueous solution because such a cross-linking agent produces a self-polymerization reaction in an aqueous solution. Hence, use of a cross-linking agent in which ligands of the cationic metal are lactate ions is more preferable in terms of discharging stability of the liquid material. However, addition of a chelate agent such as a gluconic acid and triethanol amine makes it possible to suppress a self-polymerization reaction of ammonium zirconium carbonate in an aqueous solution and improve discharging stability.

—Other Components—

The other components may be appropriately selected considering various conditions such as the kind of the unit configured to deliver the liquid material for forming a three-dimensional object, frequency of use, and amount. When the liquid material is delivered according to an inkjet method, the other components may be selected considering influences such as clogging of nozzle heads of an inkjet printer, etc. Examples of the other components include a preservative, an antiseptic, a stabilizer, and a pH adjuster.

A method for preparing the liquid material for forming a three-dimensional object is not particularly limited, and an arbitrary method may be selected according to the purpose. Examples of the method include a method for adding, mixing, and dissolving the cross-linking agent, and as needed, the other components in the aqueous medium.

A content (concentration) of the cross-linking agent in the liquid material has no particular limit and may be appropriately selected according to the purpose. A content at which the concentration of the cross-linking agent will be from 0.1 parts by mass (% by mass) to 50 parts by mass (% by mass) relative to 100 parts by mass of the organic material is preferable. A content at which the concentration will be from 0.5 parts by mass (% by mass) to 40 parts by mass (% by mass) is more preferable. A content at which the concentration will be from 1 part by mass (% by mass) to 35 parts by mass (% by mass) is particularly preferable.

When the concentration is 0.1% by mass or higher, a hardened product (three-dimensional object) formed of the powder material for forming a three-dimensional object and produced by delivering the liquid material to the powder material for forming a three-dimensional object has an improved strength. Owing to the improved strength, problems such as a shape collapse will not occur during post-treatment or handling such as sintering. When the concentration is 50% by mass or lower, the hardened product (three-dimensional object) formed of the powder material for forming a three-dimensional object and produced by delivering the liquid material to the powder material for forming a three-dimensional object has an improved dimensional precision. The cross-linking agent may be included in the material set for forming a three-dimensional object of the present invention in the form of a solid instead of being included in the liquid material. The material set for forming a three-dimensional object may be adapted such that the cross-linking agent is mixed with the aqueous medium and prepared as the liquid material when used.

<Three-Dimensional Object>

A three-dimensional object obtained in the present invention is a hardened product produced by delivering the liquid material for forming a three-dimensional object of the present invention to the powder material for forming a three-dimensional object described above, and used as a hardened product to be sintered for producing a compact (a sintered body of the three-dimensional object) by sintering. The hardened product may be a hardened product produced by using the material set for forming a three-dimensional object of the present invention described above, and delivering the liquid material for forming a three-dimensional object included in the material set for forming a three-dimensional object to the powder material for forming a three-dimensional object included in the material set for forming a three-dimensional object.

The three-dimensional object has a sufficient strength even though the three-dimensional object has been produced only by delivering the liquid material for forming a three-dimensional object to the powder material for forming a three-dimensional object. In the three-dimensional object, the base material is present densely (at a high filling rate), and the organic material is present only slightly around the particles of the base material. Therefore, when the three-dimensional object is subjected to sintering or the like later to obtain a compact (a sintered body), it is possible for the obtained compact to have been suppressed in the amount of organic components that have been volatilized (dewaxed) unlike when a hardened product of conventional powders or particles produced by using an adhesive or the like is sintered. The obtained compact contains no unnecessary voids (marks of dewaxing), etc., and a compact having a beautiful appearance can be obtained.

The strength of the three-dimensional object is, for example, a level at which the three-dimensional object does not undergo a shape collapse or the like when the surface of the three-dimensional object is rubbed, and such a level at which the three-dimensional object does not undergo cracking or the like when the three-dimensional object is blown with air from a distance of 5 cm away with an air gun having a nozzle caliber of 2 mm and an air pressure of 0.3 MPa.

(Three-Dimensional Object Producing Method and Three-Dimensional Object Producing Apparatus)

A three-dimensional object producing method of the present invention includes a powder material layer forming step and a liquid material delivering step, and further includes other steps such as a sintering step as needed.

The three-dimensional object producing method features repeating the powder material layer forming step and the liquid material delivering step to produce a three-dimensional object.

A three-dimensional object producing apparatus of the present invention includes a powder material layer forming unit and a liquid material delivering unit, and further includes other units such as a powder material container, a liquid material container, a liquid material supplying unit, and a sintering unit as needed.

—Powder Material Layer Forming Step and Powder Material Layer Forming Unit—

The powder material layer forming step is a step of forming a layer of a powder material for forming a three-dimensional object containing an organic material and a base material.

The powder material layer forming unit is a unit configured to form a layer of a powder material for forming a three-dimensional object containing an organic material and a base material.

It is preferable that the powder material for forming a three-dimensional object be placed over a supporting member and supplied over a laminated powder material for forming a three-dimensional object.

—Supporting Member—

The supporting member is not particularly limited, and an arbitrary supporting member may be selected according to the purpose so long as such a supporting member can have the powder material for forming a three-dimensional object placed over the supporting member. Examples of the supporting member include a table having a placing surface over which the powder material for forming a three-dimensional object is placed, and a base plate of an apparatus illustrated in FIG. 1 of JP-A No. 2000-328106.

The surface of the supporting member, i.e., the placing surface over which the powder material for forming a three-dimensional object is placed may be a smooth surface, a coarse surface, a flat surface, or a curved surface. It is preferable that the surface and the placing surface have a low affinity with the organic material contained in the powder material for forming a three-dimensional object when the organic material is dissolved and cross-linked by the action of the cross-linking agent.

It is preferable that affinity between the placing surface and the dissolved, cross-linked organic material be lower than affinity between the base material and the dissolved, cross-linked organic material, because this makes it easy to detach the obtained three-dimensional object from the placing surface.

—Supplying of Powder Material—

A method for placing the powder material for forming a three-dimensional object over the supporting member to have a predetermined thickness is not particularly limited, and an arbitrary method may be selected according to the purpose. The method for placing may be a method using a known counter rolling mechanism (a counter roller) or the like and used in a selective laser sintering method described in Japanese Patent (JP-B) No. 3607300. The method for placing may be a method for spreading the powder material for forming a three-dimensional object to have a predetermined thickness with a member such as a brush, a roller, and a blade. The method for placing may be a method for spreading the powder material for forming a three-dimensional object to have a predetermined thickness by pressing the surface of the powder material for forming a three-dimensional object with a pressing member, a method using a known three-dimensional object producing apparatus, etc.

The powder material for forming a three-dimensional object can be supplied onto the supporting member to have a predetermined thickness with the counter rolling mechanism (counter roller), the brush, roller, or blade, the pressing member, etc. in the manner described below, for example.

The supporting member is disposed within an outer frame (may also be referred to as "mold", "hollow cylinder", "tubular structure", etc.) such that the supporting member can be lifted up or down while sliding over the inner wall of the outer frame. The powder material for forming a three-dimensional object is placed over the supporting member with the counter rolling machine, the brush, or roller, or blade, the pressing member, or the like. In the case where the supporting member is a member that can be lifted up or down within the outer frame, the supporting member is disposed at a position slightly below the upper end opening of the outer frame, i.e., at a position below the upper end opening by an amount corresponding to the predetermined thickness of the powder material, and then the powder material is placed over the supporting member. In this way, the powder material for forming a three-dimensional object can be placed over the supporting member to have a predetermined thickness.

When the liquid material is caused to act on the powder material for forming a three-dimensional object that is placed to have a predetermined thickness in this way, the placed powder material for forming a three-dimensional object is hardened.

Then, when the powder material for forming a three-dimensional object is placed to have a predetermined thickness in the same manner as described above over the obtained hardened product having a predetermined thickness, and the liquid material is caused to act on the powder material placed to have a predetermined thickness, hardening occurs. This hardening occurs not only in the powder material placed to have a predetermined thickness, but also in the underlying hardened product having a predetermined thickness produced by the previous hardening. As a result, a hardened product (a three-dimensional object) having a thickness corresponding to about double the thickness of the placed powder material is obtained.

Further, an automatic simple manner using the known three-dimensional object producing apparatus may be employed to place the powder material for forming a three-dimensional object over the supporting member to have a predetermined thickness. Typically, the known three-dimensional object producing apparatus includes a movable supplying tank, a recoater, and a movable forming tank. The movable supplying tank is configured to supply the powder material for forming a three-dimensional object onto the supporting member. The recoater is configured to level the supplied powder material for forming a three-dimensional object to have a predetermined thickness. The movable forming tank is configured such that the powder material for forming a three-dimensional object having a predetermined thickness is placed and laminated inside.

In the three-dimensional object producing apparatus, it is possible to constantly dispose the surface of the movable supplying tank slightly above the surface of the movable forming tank, by lifting up the movable supplying tank, by lifting down the movable forming tank, or by both, it is possible to place the powder material for forming a three-dimensional object to have a predetermined thickness by actuating the recoater from the movable supplying tank side, and it is possible to laminate the powder material for forming a three-dimensional object having a predetermined thickness by repeatedly moving the recoater.

The predetermined thickness of the powder material for forming a three-dimensional object has no particular limit, and may be appropriately selected according to the purpose. However, the predetermined thickness as expressed in average thickness is preferably from 30 μm to 500 μm, and more preferably from 60 μm to 300 μm.

When the thickness is 30 μm or greater, a hardened product (three-dimensional object) formed of the powder material for forming a three-dimensional object and produced by delivering the liquid material to the powder material for forming a three-dimensional object has a sufficient strength, and will not cause problems such as a shape collapse during post-treatment or handling such as sintering. When the thickness is 500 μm or less, the hardened product (three-dimensional object) formed of the powder material for forming a three-dimensional object and produced by delivering the liquid material to the powder material for forming a three-dimensional object has an improved dimensional precision.

The average thickness has no particular limit and can be measured according to a known method.

—Liquid Material Delivering Step and Liquid Material Delivering Unit—

The liquid material delivering step is a step of delivering a liquid material for forming a three-dimensional object to a predetermined region of the layer of the powder material formed in the powder material layer forming step.

The liquid material delivering unit is a unit configured to deliver a liquid material for forming a three-dimensional object to a predetermined region of the layer of the powder material formed by the powder material layer forming unit.

A method for delivering the liquid material to the powder material is not particularly limited, and an arbitrary method may be selected according to the purpose. Examples of the method include a dispenser method, a spray method, and an inkjet method. For carrying out these methods, known apparatuses can be favorably used as the liquid material delivering unit.

Among these, the dispenser method has excellent liquid droplet quantitativity, but has a small coating coverage. The spray method can form a minute discharge of the materials easily and has a wide coating coverage and excellent coatability, but has a poor liquid droplet quantitativity and causes powder scattering due to a spray current. Hence, in the present invention, the inkjet method is particularly preferable. The inkjet method is preferable because the inkjet method is better than the spray method in liquid droplet quantitativity, can obtain a greater coating coverage than can be obtained by the dispenser method, and can form a complicated three-dimensional shape with a good precision efficiently.

In the case of the inkjet method, the liquid material delivering unit includes nozzles capable of delivering the liquid material to the placed powder material for forming a three-dimensional object according to the inkjet method. Nozzles (discharging heads) of a known inkjet printer can be favorably used as the nozzles, and the inkjet printer can be favorably used as the liquid material delivering unit. Preferable examples of the inkjet printer include SG7100 available from Ricoh Company, Ltd. The inkjet printer is preferable because the inkjet printer can realize rapid coating owing to the capability of dropping the liquid material from the heads in a large amount at a time and coating a large area.

The liquid material for forming a three-dimensional object of the present invention is free of solids such as particles. Therefore, the liquid material is advantageous in that the inkjet printer capable of delivering the liquid material precisely and highly efficiently can be used without clogging or corroding of nozzles of the inkjet printer or heads of the nozzles; the liquid material can permeate the organic material contained in the supplied powder material for forming a three-dimensional object efficiently when the liquid material is delivered (discharged) to the powder material for forming a three-dimensional object; and owing to the efficient permeation, efficiency of producing a three-dimensional object is excellent, and a cross-linked product having a good dimensional precision can be obtained easily, in a short time, and efficiently.

The cross-linking agent can also function as a pH adjuster in the liquid material for forming a three-dimensional object. When the inkjet method is used to deliver the liquid material to the placed powder material for forming a three-dimensional object, the pH of the liquid material is preferably from 5 (weakly acidic) to 12 (basic), and more preferably from 8 (weakly basic) to 10 (weakly basic), in terms of preventing corroding and clogging of the nozzle head portions of the nozzles used. For the pH adjustment, a known pH adjuster may be used.

—Powder Material Container—

The powder material container is a member having stored the powder material for forming a three-dimensional object. The powder material container may be of any size, any form, and any material that are appropriately selected according to the purpose. Examples of the powder material container include a storing reservoir, a bag, a cartridge, and a tank.

—Liquid Material Container—

The liquid material container is a member having stored the liquid material. The liquid material container may be of any size, any form, and any material that are appropriately selected according to the purpose. Examples of the liquid material container include a storing reservoir, a bag, a cartridge, and a tank.

—Other Steps and Other Units—

Examples of the other steps include a drying step, a sintering step, a surface protection treatment step, and a painting step.

Examples of the other units include a drying unit, a sintering unit, a surface protection treatment unit, and a painting unit.

The drying step is a step of drying a hardened product (three-dimensional object) obtained in the powder material layer forming step. In the drying step, it is possible to remove water contained in the hardened product, and also remove (dewax) any organic material contained in the hardened product. Examples of the drying unit include known dryers.

The sintering step is a step of sintering a hardened product (three-dimensional object) formed in the powder material layer forming step. Through the sintering step, the hardened product can be produced into a monolithic metal or ceramic compact (a sintered body of the three-dimensional object). Examples of the sintering unit include known sintering furnaces.

The surface protection treatment step is a step of performing formation, etc. of a protective layer over the hardened product (three-dimensional object) formed in the liquid material delivering step. With the surface protection treatment step, durability or the like that, for example, enables the hardened product (three-dimensional object) to be used as it is can be imparted to the surface of the hardened product (three-dimensional object). Specific examples of the protective layer include a water-resistant layer, a weatherable layer, a light-resistant layer, a heat-insulating layer, and a gloss layer. Examples of the surface protection treatment unit include known surface protection treatment apparatuses such as spray apparatuses and coating apparatuses.

The painting step is a step of painting the hardened product (three-dimensional object) formed in the liquid material delivering step. With the painting step, the hardened product (three-dimensional object) can be colored in a desired color. Examples of the unit configured to perform the painting step include known painting apparatuses such as painting apparatuses using a spray, a roller, a brush, etc.

FIG. 1 illustrates an example of a three-dimensional object producing apparatus of the present invention. The three-dimensional object producing apparatus of FIG. 1 includes a forming-side powder storing tank 1 and a supplying-side powder storing tank 2. These powder storing tanks each include a stage 3 movable upward and downward. The powder material for forming a three-dimensional object is supplied onto and placed over the stage 3 of the forming-side powder storing tank 1 to have a predetermined thickness.

The three-dimensional object producing apparatus includes an inkjet head 5 and a leveling mechanism 6 (hereinafter, may be referred to as recoater). The inkjet head 5 is disposed above the forming-side powder storing tank 1, and configured to discharge a liquid material 4 toward the powder material for forming a three-dimensional object placed in the powder storing tank. The leveling mechanism 6 is configured to supply the powder material for forming a three-dimensional object from the supplying-side powder storing tank 2 to the forming-side powder storing tank 1 and level the surface of the powder material for forming a three-dimensional object placed in the forming-side powder storing tank 1.

The liquid material is dropped from the inkjet head 5 onto the surface of the powder material for forming a three-dimensional object placed in the forming-side powder storing tank 1. The position to which the liquid material is dropped is determined based on two-dimensional image data (slice data) representing a plurality of planar layers into which a three-dimensional shape finally desired is sliced.

When printing of the sliced two-dimensional image data is completed, the stage of the supplying-side powder storing tank 2 is lifted up, and the stage 3 of the forming-side powder storing tank 1 is lifted down, which produces a height difference. An amount of the powder material for forming a three-dimensional object corresponding to the height difference is moved to the forming-side powder storing tank 1 by the leveling mechanism 6.

In this way, the powder material for forming a three-dimensional object is newly placed to have a predetermined thickness over the surface of the powder material for forming a three-dimensional object placed and printed earlier. The thickness of the newly placed powder material for forming a three-dimensional object is from about some tens of micrometers to 100 μm.

Printing is performed over the newly placed powder material for forming a three-dimensional object based on the slice data for the second layer. This sequence of process is repeated to obtain a three-dimensional object. The three-dimensional object is heated and dried by an unillustrated drying unit to obtain the completed three-dimensional object.

Figure 2:
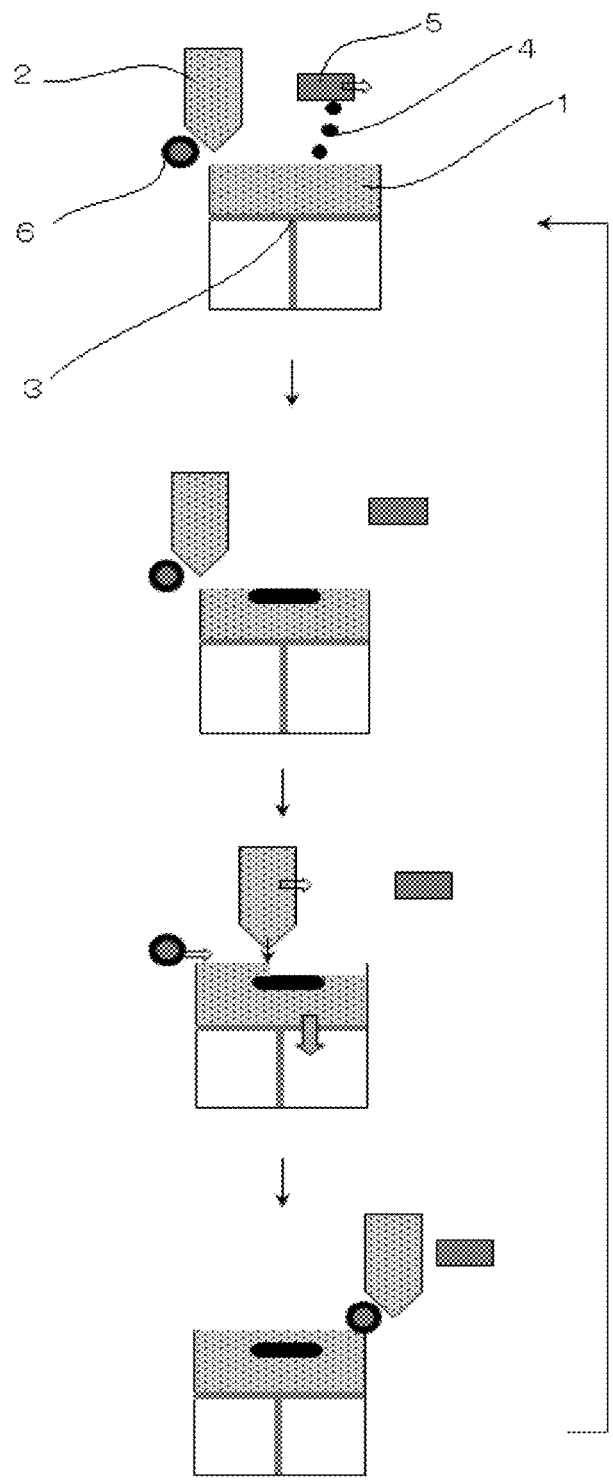
FIG. 2 is a schematic diagram illustrating another example of a three-dimensional object producing apparatus of the present invention.

FIG. 2 illustrates another examples of a three-dimensional object producing apparatus of the present invention. The three-dimensional object producing apparatus of FIG. 2 is identical with the three-dimensional object producing apparatus of FIG. 1 in principle but different from the three-dimensional object producing apparatus of FIG. 1 in the mechanism of supplying the powder material for forming a three-dimensional object. That is, the supplying-side powder storing tank 2 is disposed above the forming-side powder storing tank 1.

When printing over the surface of the powder material for forming a three-dimensional object placed in the forming-side powder storing tank 1 is completed, the stage 3 of the forming-side powder storing tank 1 lifts down by a predetermined amount. The supplying-side powder storing tank 2 moves while dropping a predetermined amount of the powder material for forming a three-dimensional object into the forming-side powder storing tank 1 to newly place the powder material for forming a three-dimensional object to have a predetermined thickness. After this, the leveling mechanism 6 compresses the powder material for forming a three-dimensional object to increase the bulk density, and levels off the powder material for forming a three-dimensional object to a uniform height.

The three-dimensional object producing apparatus having the configuration of FIG. 2 can be made smaller in size than the configuration of FIG. 1 in which two powder storing tanks are arranged horizontally.

The above-described three-dimensional object producing method and producing apparatus of the present invention can produce a three-dimensional object having a complicated stereoscopic (three-dimensional (3D)) shape with the above-described liquid material for forming a three-dimensional object or material set for forming a three-dimensional object of the present invention easily and efficiently. The produced three-dimensional object will not undergo a shape collapse before sintering, etc., and the three-dimensional object can be produced to have a good dimensional precision.

Figure 3:
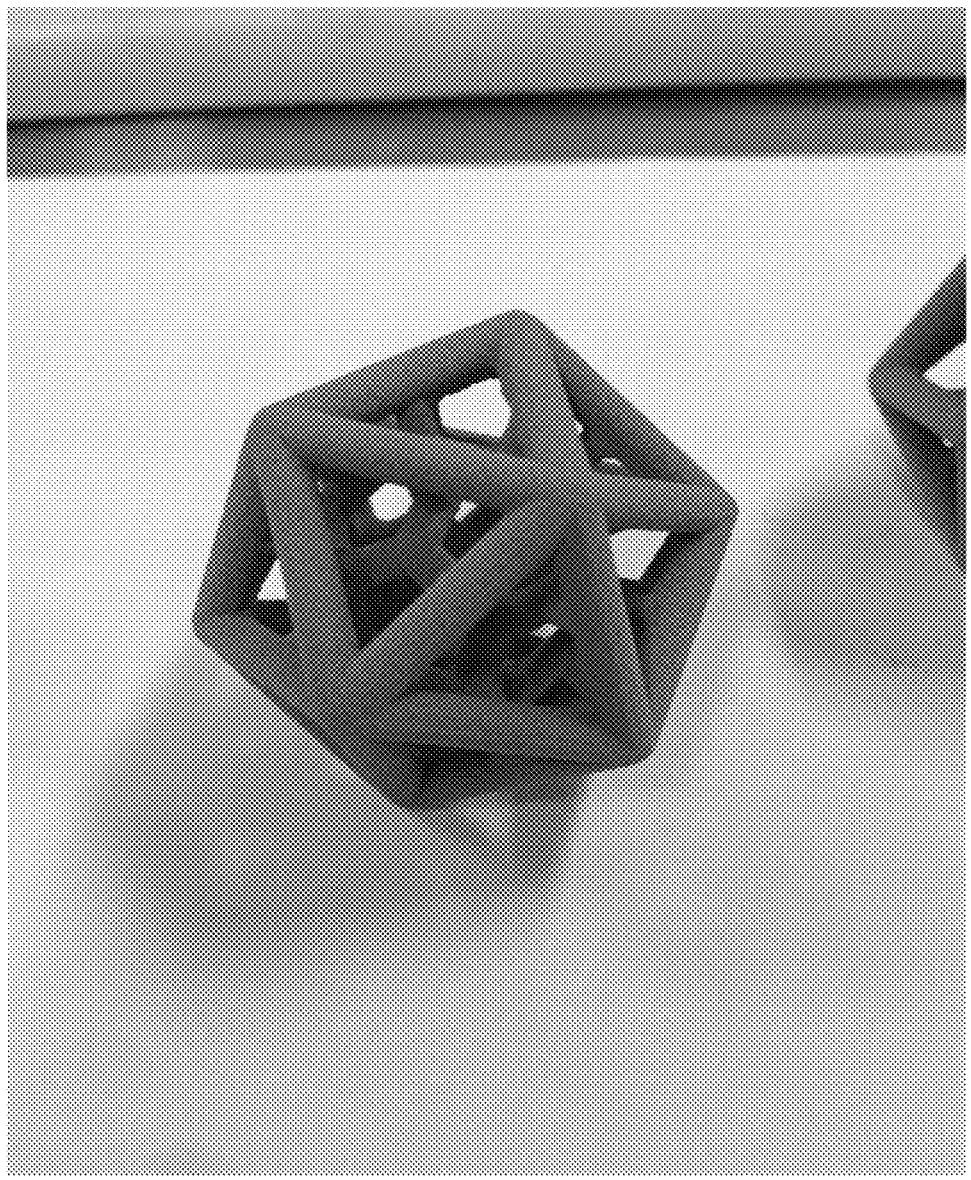
FIG. 3 is an image illustrating an example of a three-dimensional object produced with a material set for forming a three-dimensional object of the present invention.

FIG. 3 is an image illustrating an example of a three-dimensional object produced with the material set for forming a three-dimensional object of the present invention. In spite of the complicated shape, the three-dimensional object did not undergo a shape collapse before sintering, etc. Hence, the three-dimensional object and a sintered body of the three-dimensional object that were produced with the liquid material for forming a three-dimensional object or the material set for forming a three-dimensional object of the present invention have a sufficient strength. Further, the three-dimensional object and the sintered body of the three-dimensional object have excellent dimensional precision and can reproduce minute asperity, curved surfaces, etc. Therefore, the three-dimensional object and the sintered body of the three-dimensional object are excellent in aesthetic appearance, have a high quality, and can be used favorably for various purposes.

EXAMPLES

Examples of the present invention will be described below. However, the present invention is not limited to these Examples by any means.

—Preparation of Powder Material 1 for Forming Three-Dimensional Object—
—Preparation of Coating Liquid 1—

An acetoacetyl group-modified polyvinyl alcohol, which was a water-soluble resin (GOHSENX Z-100 available from Nippon Synthetic Chemical Industry Co., Ltd., with an average degree of polymerization of 500 and a degree of saponification of 98.5 mol %) (6 parts by mass) was mixed with water (114 parts by mass). Then, while being heated to 90° C. in a water bath, the acetoacetyl group-modified polyvinyl alcohol and the water were stirred with a three-one motor (BL600 available from Shinto Scientific Co., Ltd.) for 1 hour, to dissolve the acetoacetyl group-modified polyvinyl alcohol in the water. In this way, a 5% by mass acetoacetyl group-modified polyvinyl alcohol aqueous solution (120 parts by mass) was prepared. The obtained preparation liquid was used as a coating liquid 1.

The viscosity of the acetoacetyl group-modified polyvinyl alcohol in a 4% by mass (w/w %) aqueous solution at 20° C. was measured with a viscometer, and was from 5.0 mPa·s to 6.0 mPa·s. As the viscometer, DV-E VISCOMETER HADVE 115 TYPE, which was a rotary viscometer available from Brookfield Engineering Laboratories, was used.

—Coating of Coating Liquid 1 Over Surface of Base Material—

Next, with a commercially available coating apparatus (MP-01 available from Powrex Corp.), a stainless steel powder as the base material (100 parts by mass) was coated with the coating liquid 1 to a coating thickness (average thickness) of 200 nm. As the stainless steel powder, PSS316L, which was a powder of SUS316L available from Sanyo Special Steel Co., Ltd. and having a volume average particle diameter of 41 μm, was used. Half way through this coating, the coating thickness (average thickness) of the coating liquid 1 was sampled at appropriate timings to adjust the coating time and intervals appropriately to obtain a coating thickness (average thickness) of 200 nm and a coating coverage (%) of 100%. In the way described above, a powder material 1 for forming a three-dimensional object was produced. Methods for measuring the coating thickness and the surface coating coverage and conditions of the coating are presented below.

<Coating Thickness (Average Thickness)>

For measurement of the coating thickness (average thickness), the surface of the powder material 1 for forming a three-dimensional object was polished with emery paper, and then lightly polished with a cloth impregnated with water to dissolve the water-soluble resin portion and produce a sample for observation. Next, the exposed and surfaced boundary portion between the base material portion and the water-soluble resin portion was observed with a Field Emission Scanning Electron Microscope (FE-SEM), and the boundary portion was measured as a coating thickness. An average value of ten measurement points was calculated as the coating thickness (average thickness).

<Surface Coating Coverage>

With a Field Emission Scanning Electron Microscope (FE-SEM), a reflected electron image (ESB) was captured under the conditions described below under a viewing field setting that enabled about ten particles of the powder material 1 for forming a three-dimensional object to fall within the imaging window. The reflected electron image was then binarized according to image processing by IMAGEJ software. The coverage was calculated according to area of black portions per particle/(area of black portions+area of white portions)×100, where black portions were coated portions and white portions were base material portions. Ten particles were measured, and the average value of the ten particles was calculated as the surface coating coverage (%).

—SEM Observation Conditions—

Signal: ESB (reflected electron image)
EHT: 0.80 kV
ESB Grid: 700 V
WD: 3.0 mm
Aperture Size: 30.00 µm
Contrast: 80%
Magnification: set for each sample such that about ten particles fell within the imaging window in the lateral direction <Coating Conditions>

—Spray Settings

Nozzle type: 970
Nozzle caliber: 1.2 mm
Coating liquid discharging pressure: 4.7 Pa·s
Coating liquid discharging rate: 3 g/min
Amount of air atomized: 50 NL/min —Rotor Settings Rotor type: M-1
Rotational speed: 60 rpm
Number of rotations: 400%

—Air Current Settings

Air feeding temperature: 80° C.
Air feeding rate: 0.8 m$^3$/min
Filtering pressure of a bag filter: 0.2 MPa
Filtering time of a bag filter: 0.3 seconds
Bag filter intervals: 5 seconds —Coating Time: 80 Minutes The volume average particle diameter of the produced powder material 1 for forming a three-dimensional object was measured with a commercially available particle diameter measuring instrument (MICROTRAC HRA available from Nikkiso Co., Ltd.). As a result, the volume average particle diameter was 48 µm. For flowability, a repose angle of the powder material 1 for forming a three-dimensional object was measured with a commercially available repose angle measuring instrument (POWDER TESTER PT-N TYPE available from Hosokawa Micron Corporation). As a result, the repose angle was 35°. A larger repose angle measurement tends to mean a poorer flowability.

—Preparation of Liquid Material 1—

Water (70 parts by mass), a flowability modifier (30 parts by mass), a resin (5 parts by mass), and a cross-linking agent (5 parts by mass) were subjected to a dispersion treatment using a homomixer for 30 minutes, to prepare a liquid material 1. As the flowability modifier, 3-methyl-1,3-butanediol (available from Tokyo Chemical Industry Co., Ltd.) was used. As the resin, polyvinyl pyrrolidone (POLYVINYL PYRROLIDONE K30 available from Tokyo Chemical Industry Co., Ltd.) was used. As the cross-linking agent, zirconium carbonate ammonium salt (ZIRCOZOL AC-20 available from Daiichi Kigenso Kagaku Kogyo Co., Ltd.) was used.

Example 1

A three-dimensional object 1 was produced in the manner described below with the produced powder material 1 for forming a three-dimensional object and the liquid material 1, and a shape printing pattern having a size of 70 mm in length and 12 mm in width.

1) With a known three-dimensional object producing apparatus as illustrated in FIG. 1, the powder material 1 for forming a three-dimensional object was moved from the supplying-side powder storing tank to the forming-side powder storing tank to supply the powder material 1 for forming a three-dimensional object onto the supporting member to have an average thickness of 100 µm.

2) Next, the liquid material 1 was delivered (discharged) onto the surface of the supplied powder material 1 for forming a three-dimensional object from nozzles of a known inkjet discharging head. The polyvinyl alcohol was dissolved in the water contained in the liquid material 1, and the acetoacetyl group-modified polyvinyl alcohol was cross-linked by the action of the cross-linking agent (ZIRCOZOL AC-20) contained in the liquid material 1.

3) Next, the operations of 1) and 2) were repeated until a predetermined total average thickness of 3 mm, and a portion that was hardened by the liquid material 1 in the supplied powder material 1 for forming a three-dimensional object was taken out from the supplied powder material 1 for forming a three-dimensional object. Then, the taken-out portion was subjected to a drying step in which the portion was dried with a dryer at 50° C. for 3 hours and then maintained at 100° C. for 7 hours, to obtain a three-dimensional object 1.

The three-dimensional object 1 after dried was blown with air to remove any excess powder material 1 for forming a three-dimensional object. As a result, the three-dimensional object 1 did not undergo a shape collapse, and exhibited excellent strength and dimensional precision.

Incidentally, strength (hardness) and dimensional precision were evaluated according to the criteria described below. The results are presented in Table 1.

<Strength (Hardness)>

D: The powder material for forming a three-dimensional object was not hardened sufficiently, such that the three-dimensional object could not be taken out from the laminated powder material for forming a three-dimensional object, and if taken out, would not be able to maintain the predetermined shape.

C: The three-dimensional object could be taken out from the laminated powder material for forming a three-dimensional object. Unnecessary part of the powder material for forming a three-dimensional object could be removed by adjusting an air blow pressure or by using a brush, and the three-dimensional object could maintain the shape.

B: The three-dimensional object was blown with air strongly. As a result, only unnecessary part of the powder material for forming a three-dimensional object was removed, and the three-dimensional object maintained the shape.

A: The three-dimensional object was hardened sufficiently and would not be broken easily.

<Dimensional Precision>

D: The surface of three-dimensional object was distorted. Observation of the surface revealed uneven distribution of the base material and the organic material.

C: The surface of the three-dimensional object was slightly distorted and had slight irregularities.

B: The surface condition of the three-dimensional object was favorable, but the surface had a slight warpage.

A: The surface of the three-dimensional object was smooth and beautiful, and had no warpage.

4) The three-dimensional object 1 obtained in 3) was subjected to a dewaxing step by being heated with a dryer under a nitrogen atmosphere up to 500° C. in 3 hours and 58 minutes, then maintained at 400° C. for 4 hours, and then cooled to 30° C. in 4 hours. Then, the three-dimensional object 1 was sintered in a sintering furnace under vacuum conditions at 1,400° C. As a result, a three-dimensional object 1 (a sintered body) having a beautiful surface was obtained. This three-dimensional object 1 was a completely monolithic stainless structure (a metal block), and did not undergo a breakage or the like at all when slammed on a hard floor.

Example 2

A three-dimensional object 2 was produced in the same manner as in Example 1, except that polyvinyl pyrrolidone (5 parts by mass) used in Example 1 as the resin was changed to sodium polyacrylate (ARON A-7185 available from Toagosei Co., Ltd.) (1.5 parts by mass) to prepare a liquid material 2. The three-dimensional object 2 was evaluated in the same manner as in Example 1. The results are presented in Table 1.

Example 3

A three-dimensional object 3 was produced in the same manner as in Example 1, except that polyvinyl pyrrolidone (5 parts by mass) used in Example 1 as the resin was changed to an acrylic-carboxylic acid-based copolymer (ARON A-20L available from Toagosei Co., Ltd.) (0.5 parts by mass) to prepare a liquid material 3. The three-dimensional object 3 was evaluated in the same manner as in Example 1. The results are presented in Table 1.

Example 4

A three-dimensional object 4 was produced in the same manner as in Example 1, except that polyvinyl pyrrolidone (5 parts by mass) used in Example 1 as the resin was changed to polyvinyl alcohol (J POVAL JF-03 available from Japan Vam & Poval Co., Ltd.) (4 parts by mass) to prepare a liquid material 4. The three-dimensional object 4 was evaluated in the same manner as in Example 1. The results are presented in Table 1.

Example 5

A three-dimensional object 5 was produced in the same manner as in Example 1, except that polyvinyl pyrrolidone (5 parts by mass) used in Example 1 as the resin was changed to polyethylene glycol (PEG #4000 available from Lion Corporation) (3 parts by mass) to prepare a liquid material 5. The three-dimensional object 5 was evaluated in the same manner as in Example 1. The results are presented in Table 1.

Comparative Example 1

A three-dimensional object 6 was produced in the same manner as in Example 1, except that polyvinyl pyrrolidone (5 parts by mass) used in Example 1 as the resin was changed to an acrylic emulsion (ARON A-104 available from Toagosei Co., Ltd.) (5 parts by mass) to prepare a liquid material 6. The three-dimensional object 6 was evaluated in the same manner as in Example 1. The results are presented in Table 1.

TABLE 1

| | Three-dimensional object No. | Resin contained in liquid material for forming three-dimensional object | | Strength | Dimensional precision |
|---|---|---|---|---|---|
| | | Name | Tg or melting point | | |
| Ex. 1 | 1 | Polyvinyl pyrrolidone K30 | 225° C. | A | A |
| Ex. 2 | 2 | ARON A-7185 | 165° C. | A | A |
| Ex. 3 | 3 | ARON A-20L | 106° C. | A | A |
| Ex. 4 | 4 | J POVAL JF-03 | 68° C. | B | B |
| Ex. 5 | 5 | PEG #4000 | 53° C. | C | C |
| Comp. Ex. 1 | 6 | ARON A-104 | 45° C. | D | D |

Aspects of the present invention are as follows, for example.

<1> A liquid material for forming a three-dimensional object, the liquid material adapted to be delivered to a powder material for forming a three-dimensional object to harden the powder material, the powder material including an organic material and a base material, the liquid material including:

a cross-linking agent cross-linkable with the organic material; and a resin having a glass transition temperature of 50° C. or higher or a melting point of 50° C. or higher.

<2> The liquid material for forming a three-dimensional object according to <1>, wherein the glass transition temperature or the melting point of the resin is 65° C. or higher.

<3> The liquid material for forming a three-dimensional object according to <1> or <2>, wherein the resin is water-soluble.

<4> The liquid material for forming a three-dimensional object according to any one of <1> to <3>, wherein the resin is polyvinyl pyrrolidone.

<5> The liquid material for forming a three-dimensional object according to any one of <1> to <4>, wherein the liquid material has a viscosity of 25 mPa·s or lower at 25° C.

<6> The liquid material for forming a three-dimensional object according to any one of <1> to <5>, wherein the liquid material is capable of dissolving the organic material.

<7> The liquid material for forming a three-dimensional object according to any one of <1> to <6>, wherein the liquid material is alkaline.

<8> The liquid material for forming a three-dimensional object according to any one of <1> to <7>,
wherein the base material is coated with the organic material.

<9> The liquid material for forming a three-dimensional object according to any one of <1> to <8>,
wherein the cross-linking agent includes any one of a water-soluble cross-linking agent and a metal salt.

<10> A material set for forming a three-dimensional object, the material set including;
a powder material for forming a three-dimensional object, the powder material including an organic material and a base material; and
the liquid material for forming a three-dimensional object according to any one of <1> to <9>.

<11> The material set for forming a three-dimensional object according to <10>,
wherein the base material is coated with the organic material.

<12> The material set for forming a three-dimensional object according to <10> or <11>,
wherein the organic material includes a polyvinyl alcohol resin.

<13> The material set for forming a three-dimensional object according to <12>,
wherein the polyvinyl alcohol resin includes a modified polyvinyl alcohol resin.

<14> The material set for forming a three-dimensional object according to <13>,
wherein the modified polyvinyl alcohol resin includes an acetoacetyl group-modified polyvinyl alcohol resin.

<15> A three-dimensional object producing method including;
a powder material layer forming step of forming a layer of a powder material for forming a three-dimensional object, the powder material including an organic material and a base material; and
a liquid material delivering step of delivering a liquid material for forming a three-dimensional object to a predetermined region of the layer of the powder material formed in the powder material layer forming step,
wherein the three-dimensional object producing method repeats the powder material layer forming step and the liquid material delivering step to produce a three-dimensional object, and
wherein the liquid material for forming a three-dimensional object is the liquid material for forming a three-dimensional object according to any one of <1> to <9>.

<16> The three-dimensional object producing method according to <15>, further including
a sintering step of sintering the three-dimensional object produced by repeating the powder material layer forming step and the liquid material delivering step.

<17> The three-dimensional object producing method according to <15> or <16>,
wherein the liquid material for forming a three-dimensional object is delivered according to an inkjet method.

<18> A three-dimensional object producing apparatus including:
a powder material layer forming unit configured to form a layer of a powder material for forming a three-dimensional object, the powder material including an organic material and a base material;
a liquid material delivering unit configured to deliver the liquid material for forming a three-dimensional object according to any one of <1> to <9> to a predetermined region of the layer of the powder material formed by the powder material layer forming unit;
a powder material container in which the powder material for forming a three-dimensional object is stored; and
a liquid material container in which the liquid material for forming a three-dimensional object is stored.

<19> The three-dimensional object producing apparatus according to <18>, further including
a sintering unit configured to sinter a three-dimensional object produced by the powder material layer forming unit and the liquid material delivering unit.

<20> The three-dimensional object producing apparatus according to <18> or <19>,
wherein the liquid material for forming a three-dimensional object is delivered according to an inkjet method.

This application claims priority to Japanese application No. 2015-003418 filed on Jan. 9, 2015 and incorporated herein by reference.

What is claimed is:

1. A three-dimensional object producing method comprising:
forming a layer of a powder material for forming a three-dimensional object, where the powder material comprises an organic material and a base material; and
delivering a liquid material for forming a three-dimensional object to a predetermined region of the layer of the powder material formed in the forming,
wherein the three-dimensional object producing method repeats the forming and the delivering to produce a three-dimensional object, and wherein the liquid material for forming a three-dimensional object is a liquid material adapted to be delivered to a powder material for forming a three-dimensional object to harden the powder material, where the powder material comprises an organic material and a base material, where the liquid material comprises:
a cross-linking agent cross-linkable with the organic material; and
a resin having a glass transition temperature of 50° C. or higher or a melting point of 50° C. or higher.

2. The three-dimensional object producing method according to claim 1, further comprising
sintering the three-dimensional object produced by repeating the forming and the delivering.

3. The three-dimensional object producing method according to claim 1,
wherein the liquid material for forming a three-dimensional object is delivered according to an inkjet method.

4. The three-dimensional object producing method according to claim 1, wherein the resin is water-soluble.

5. The three-dimensional object producing method according to claim 1, wherein the resin comprises polyvinyl pyrrolidone.

6. The three-dimensional object producing method according to claim 1, wherein the liquid material has a viscosity of 25 mPa·s or lower at 25° C.

7. The three-dimensional object producing method according to claim 1, wherein the liquid material is alkaline.

8. The three-dimensional object producing method according to claim 1, wherein the base material is coated with the organic material.

9. The three-dimensional object producing method according to claim 1, wherein the cross-linking agent comprises any one of a water-soluble cross-linking agent and a metal salt.

* * * * *